(12) United States Patent
Stratton et al.

(10) Patent No.: US 6,311,127 B1
(45) Date of Patent: Oct. 30, 2001

(54) SATELLITE NAVIGATION SYSTEM HAVING REDUNDANT SIGNAL PROCESSING AND MATCHED FILTERING

(75) Inventors: D. Alexander Stratton, Cedar Rapids; Daryl L. McCall, Springville; Daniel J. Thuringer, Cedar Rapids, all of IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/388,972

(22) Filed: Sep. 2, 1999

(51) Int. Cl.$^7$ ........................................... G01S 5/02
(52) U.S. Cl. ................... 701/213; 701/215; 342/357.06; 342/357.12
(58) Field of Search ..................... 701/213, 215, 701/225; 342/357.06, 357.12, 358, 450

(56) References Cited

U.S. PATENT DOCUMENTS 5,999,126 * 12/1999 Ito ..................................... 342/357.1

* cited by examiner

*Primary Examiner*—Tan Nguyen
*Assistant Examiner*—Arthur D. Donnelly
(74) *Attorney, Agent, or Firm*—Nathan O. Jensen; Kyle Eppele

(57) ABSTRACT

Satellite navigation systems and receivers of the invention include an antenna which receives satellite signals from multiple satellites. Radio frequency circuitry coupled to the antenna converts the satellite signals into intermediate signals. Multiple signal processors coupled to the radio frequency circuitry implement similar or identical signal processing algorithms on the received satellite signals to provide redundant ranging information (i.e., code and carrier measurements). One or more navigation processors coupled to the signal processors process the ranging information and provide positioning data outputs. The navigation processor implements smoothing filter functions that combine the redundant ranging data in a manner which enhances the positional accuracy. The navigation processor also implements unique fault-detection filter functions on the redundant ranging information. The characteristic response of the fault-detection filter functions are matched to the response of the smoothing filter functions, ensuring that signal-processing faults are detected and before the smoothed data exhibits excessive errors.

18 Claims, 3 Drawing Sheets

FIG. 2

TABLE 1

| PRIORITY | SOURCE FOR $P_U(T_j)$ | VALIDITY CONDITION |
|---|---|---|
| 1 | $[PR_1(T_j) + PR_2(T_j)]^{1/2}$ | BOTH CHANNELS AVAILABLE, PASS OUTLIER SCREENING AND MONITORING |
| 2 | $PR_1(T_j)$ | CHANNEL 1 AVAILABLE, PASSES OUTLIER SCREENING AND MONITORING |
| 3 | $PR_2(T_j)$ | CHANNEL 2 AVAILABLE, PASSES OUTLIER SCREENING AND MONITORING |
| 4 | $P_S(T_{j-1}) + \Delta\phi(T_j)$ | NEITHER CHANNEL PASSES OUTLIER SCREENING FUNCTION FOR 1 OR 2 SEC |
| 5 | NO CODE SOURCE, RESET SMOOTHING AND MONITOR FILTER, DROP SATELLITE | NEITHER CHANNEL PASSES OUTLIER SCREENING FUNCTION FOR 3 SEC |

TABLE 2

| PRIORITY | SOURCE FOR $P_U(T_j)$ |
|---|---|
| 1 | CHANNEL 1, 1 SEC DELTA-RANGE FROM TIME j-1 TO TIME j |
| 2 | CHANNEL 2, 1 SEC DELTA-RANGE FROM TIME j-1 TO TIME j |
| 3 | NO CARRIER SOURCE; RESET SMOOTHING FILTER AND MONITOR FILTER, NAVIGATE USING UNSMOOTHED PSEUDO-RANGES |

TABLE 3

| EARLY-LATE CHIP SPACING | VALUE OF $\sigma_U$ |
|---|---|
| 1 (STANDARD) | 5.3 M |
| 0.2 | 2.3 M |
| 0.1 | 1.7M |

SATELLITE NAVIGATION SYSTEM HAVING REDUNDANT SIGNAL PROCESSING AND MATCHED FILTERING

FIELD OF THE INVENTION

The present invention relates to satellite navigation systems. More particularly, the present invention relates to satellite navigation systems which implement measurement quality monitoring and Fault Detection and Exclusion (FDE) to enhance accuracy and integrity of positioning for safety-critical applications.

BACKGROUND OF THE INVENTION

Global navigational satellite systems (GNSS) are known and include the global positioning system (GPS) and the Russian global orbiting navigational satellite system (GLONASS). GNSS-based navigational systems are used for navigation and positioning applications. In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency $f_{L1}$ of 1575.42 MHz, and an L2 signal having a frequency $f_{L2}$ of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code) is reserved for military uses.

GPS navigational systems determine positions by timing how long it takes the coded radio GPS signal to reach the receiver from a particular satellite (e.g., the travel time). The receiver generates a set of codes identical to those codes (e.g., the Y-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver. By receiving GPS signals from four or more satellites, a receiver unit can accurately determine its position in three dimensions (e.g., longitude, latitude, and altitude). A conventional GPS receiver typically utilizes the fourth satellite to accommodate a timing offset between the clocks in the receiver and the clocks in the satellites. Additional satellite measurements can be used to improve the position solution.

Safety-critical satellite navigation systems require highly accurate and reliable measurement information. In safety-of-life applications such as precision aircraft landing, the equipment must be designed to ensure that it is extremely unlikely that it provides misleading navigation data (i.e., the system must function with high integrity). Noise in the code ranging (pseudorange) measurements degrades accuracy and can cause disagreements between redundant navigation sources (false alarms). Common methods to reduce ranging measurement error, such as complementary filtering of code and carrier measurements (carrier smoothing), require continuous carrier tracking, which can be difficult to maintain in interference and jamming environments. Enhancements in integrity, accuracy and carrier continuity are needed in safety-critical applications.

SUMMARY OF THE INVENTION

Satellite navigation systems and receivers of the present invention include an antenna adapted to receive satellite signals transmitted from a plurality of satellites. Radio frequency circuitry coupled to the antenna is adapted to convert the satellite signals into intermediate signals. Multiple (two or more) signal processors coupled to the radio frequency circuitry are adapted to implement similar or identical signal processing algorithms on the received satellite signals to provide redundant ranging information (i.e., code and carrier measurements). One or more navigation processors coupled to the signal processors process the ranging information and provide positioning data outputs.

The navigation processor of the present invention implements novel smoothing filter functions that combine the redundant ranging data in a manner which enhances the positional accuracy as compared to conventional smoothing filters that do not process redundant information. In parallel, the navigation processor implements unique fault-detection filter functions on the redundant ranging information to detect and exclude poor-quality ranging measurements and to detect faults in the individual signal processors that would otherwise cause misleading information to be output by the navigation processor. The characteristic response of the fault-detection filter functions are matched to the response of the smoothing filter functions, ensuring that signal processing faults are detected and before the smoothed data exhibits excessive errors.

BRIEF DESCRIPTION OF THE DRAWINGS

FIG. 2 illustrates tabulated data for exemplary embodiments of the receiver shown in FIG. 1.

DETAILED DESCRIPTION OF AN ILLUSTRATIVE EMBODIMENT

Figure 1:
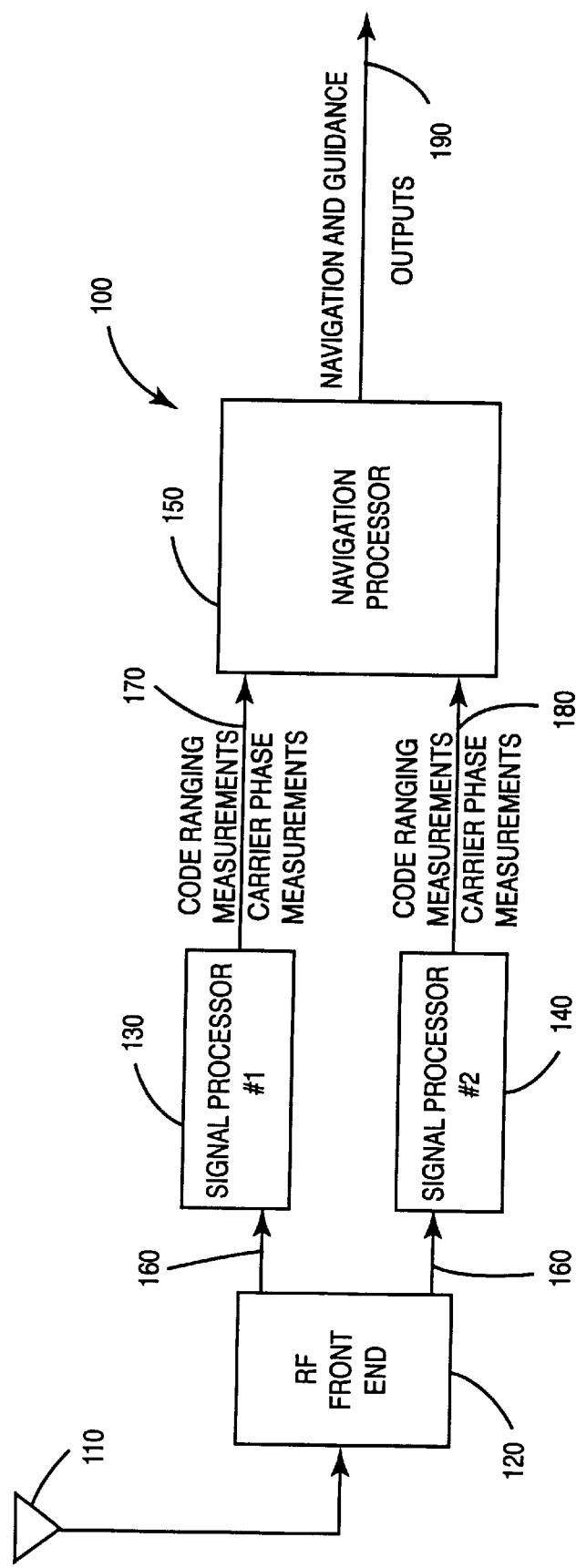
FIG. 1 is a block diagram illustrating a satellite navigation system receiver in accordance with an illustrative embodiment of the invention.
Figure 3:
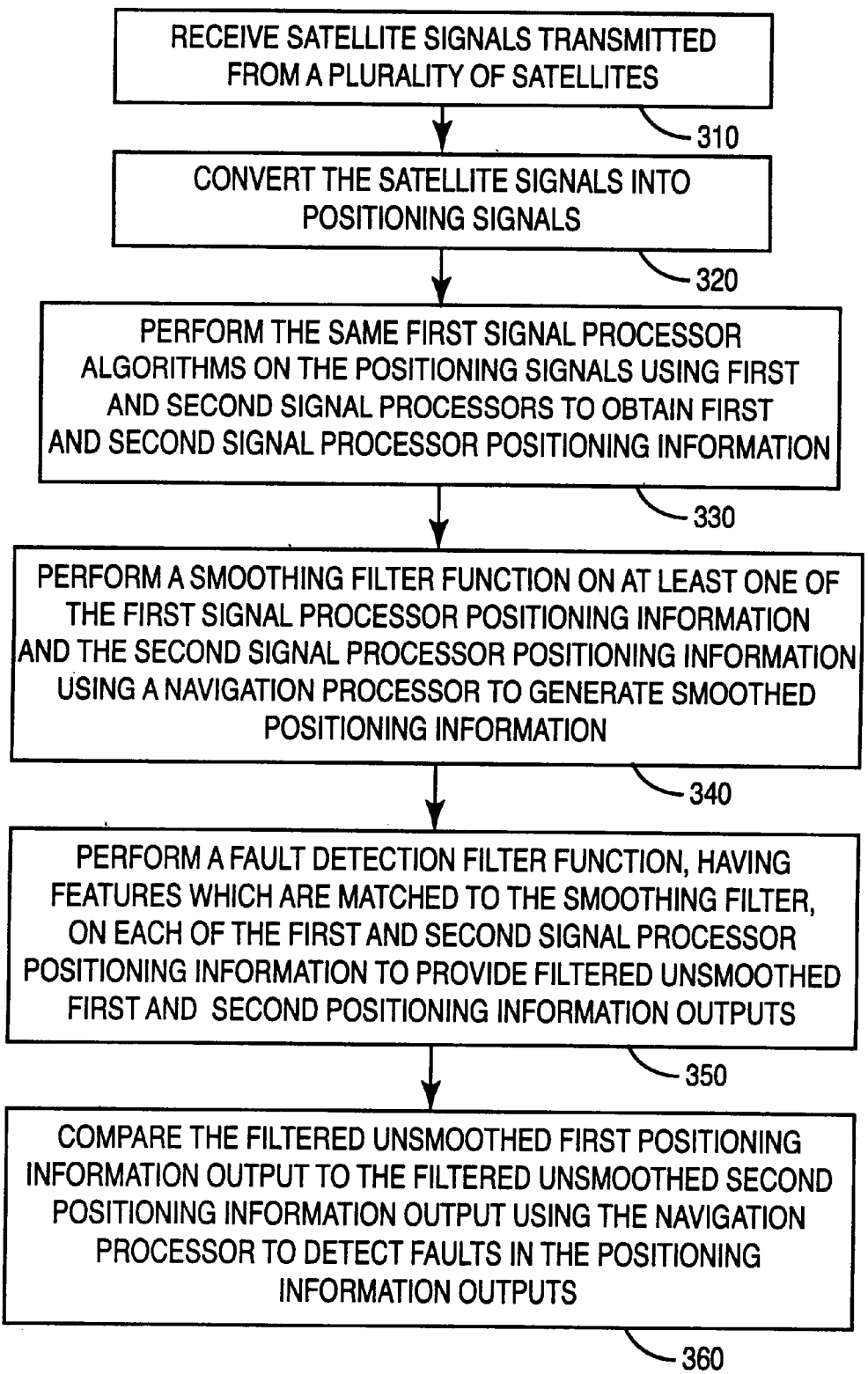
FIG. 3 is a block diagram illustrating methods of processing position information in accordance with embodiments of the invention.

FIG. 1 illustrates satellite navigation receiver 100 in accordance with embodiments of the invention. Receiver 100 includes antenna 110, radio frequency (RF) front end circuitry 120, first signal processor 130, second signal processor 140, and navigation processor 150. Antenna 110 can be an antenna array or other devices adapted to receive satellite signals transmitted from multiple GNSS satellites (not shown) such as the satellites in the GPS or GLONASS constellations.

Radio frequency circuitry 120 is coupled to antenna 110 and is adapted to convert the satellite signals into intermediate signals 160. Typically, conversion of the satellite signals by RF circuitry 120 will include conversion of the satellite signals from an L-band frequency to a lower intermediate frequency. However, conversion of the satellite signals preserves the positioning information contained in the unconverted satellite signals. In an exemplary embodiment, intermediate signals 160 are indicative of code pseudorange measurements, carrier phase measurements, almanac data and ephemeris data. Intermediate signals 160 can be digital data streams, or they can be digitally modulated analog signals.

First and second signal processors 130 and 140 are circuits and/or electrical components adapted to process intermediate signals 160 in a variety of manners. For example, if intermediate signals 160 are encoded RF signals, signal processors 130 and 140 can include analog-to-digital converters or other circuitry that extracts the encoded information from the positioning signals. Outputs 170 and 180 from signal processors 130 and 140 respectively include first and second signal processor ranging information. The first and second signal processor ranging information includes code pseudorange measurements and carrier phase measurements extracted from intermediate signals 160. The first and second signal processor ranging information can also include almanac and ephemeris data.

In exemplary embodiments, first and second signal processors are substantially identical, providing redundant signal processing paths for intermediate information 160. In these embodiments, substantially all signal processing algorithms and functions implemented by signal processor 130 to obtain information 170 are also implemented by signal processor 140 to obtain information 180.

Navigation processor 150 is coupled to each of signal processors 130 and 140 and processes the ranging information 170 and 180. Navigation processor 150 implements a smoothing filter function on a linear combination of the first signal processor ranging information 170 and the second signal processor ranging information 180 to obtain smoothed pseudorange data. Navigation processor 150 then generates a navigation output 190, indicative of position or other information, using the smoothed pseudorange data. Navigation processor 150 also implements a fault detection filter function on each of ranging information 170 and ranging information 180 to provide filtered fault detection residual information. Then, navigation processor 150 evaluates the filtered fault detection residual information to exclude poor-quality or erroneous information and identify signal processing faults. In accordance with embodiments of the invention, the fault detection filter characteristics implemented by navigation processor 150 are matched to the smoothing filter characteristics implemented by processor 150 to ensure that the response of the fault-detection residuals will match the growth of errors in the smoothed ranging information in the case of a fault in either of the signal processors 130 and 140. Thus, fault detection is performed based on noise-filtered information, while still guaranteeing that faults are detected within tight time-to-alarm constraints. This technique does not rely on carrier continuity to maintain operation of the fault-detection filter.

An additional technique employed in the exemplary embodiment is the use of redundant carrier measurements provided by signal processors 130 and 140 to enhance the continuity of the carrier sources used for accuracy enhancement (e.g., smoothing) while receiver 100 is operating in high interference and jamming environments. Inclusion of separate signal processors 130 and 140 also allows for enhanced cycle-slip detection capability and for the comparison of redundant navigation down-link data (e.g., ephemeris data) to reduce bit error effects.

In one embodiment, the smoothing filter function implemented by navigation processor 150 is represented by the relationship of Equation 1. Processor 150 can perform 1 Hz smoothing of all pseudoranges used for navigation using the following filter:

$$P_S(t_j) = k_j P_U(t_j) + (1-k_j)[P_S(t_{j-1}) + \Delta\phi(t_j)] \quad \text{Equation 1}$$

where, $k_j$=the filter gain at time $t_j$, which is equal to 1/N, where N is the number of samples smoothed, up to a maximum of 100, (for satellites below 5 deg, N=1);

$P_U(t_j)$=the unsmoothed pseudorange source from the priority table (Table 1 in FIG. 2);

$PR_1(t_j)$=the Channel 1 (from processor 130) un-smoothed pseudorange at time $t_j$;

$PR_2(t_j)$=the Channel 2 (from processor 140) unsmoothed pseudorange at time $t_j$;

$P_S(t_j)$=the carrier-smoothed pseudorange output used for navigation at time $t_j$;

$P_S(t_{j-1})$=the previous carrier-smoothed pseudorange (at filter initialization $P(0)=P_U(0)$); and $\Delta\phi(t_j)$=a carrier source taken from the table of priorities (Table 2 in FIG. 2).

When a carrier source is available via one of processors 130 and 140, all unsmoothed pseudoranges, $P_i(t_j)$, can be validated by processor 150 using the following outlier screening function of Equation 2:

$$|P_i(t_j) - [P_S(t_{j-1}) + \Delta\phi(t_j)]| < 4\sigma_u \quad \text{Equation 2}$$

where $\sigma_u$ is a statistical bound on the RMS noise in the unsmoothed pseudorange of signal processors 130 and 140.

Navigation processor 150 can monitor all un-smoothed pseudoranges used in the navigation solution using the following exemplary monitoring scheme (steps a through f detailed below) for each pseudorange:

a) Before beginning to navigate with a new satellite, both Channel 1 (provided by signal processor 130) and Channel 2 (provided by signal processor 140) must have an un-smoothed pseudorange available, and the validity check of Equation 3 must pass:

$$[PR_1(t_j) - PR_2(t_j)] < 4\sigma_u \quad \text{Equation 3}$$

b) Whenever carrier-smoothing is performed, processor 150 evaluates the filtered, un-smoothed pseudorange residual, $B_i(t_j)$, at a rate of once per second, where each filtered residual is constructed using a first-order filter equivalent (Equation 4) to the smoothing filter of Equation 3:

$$B_i(t_j) = (1-k_j)B_i(t_{j-1}) + k_j[PR_1(t_j) - PR_2(t_j)] \quad \text{Equation 4}$$

where, $k_j$=the smoothing filter gain at time $t_j$, for satellite vehicle (SV) i;

$PR_1(t_j)$=the unsmoothed pseudorange from channel 1, SV i, passes outlier screening;

$PR_2(t_j)$=the unsmoothed pseudorange from channel 2, SV i, passes outlier screening.

$B_i(t_{j-1})$=is the previous residual (at filter initialization $B_i(0) = [PR_1(0) - PR_2(0)]$.

Thus, the function in Equation 4 is matched to the function in Equation 1.

(c) Processor 150 determines a threshold T by propagating Equation 5 and 6:

$$P_i(t_j) = [(N-1)/N]^2 P_i(t_{j-1}) + 2\sigma_u^2/N^2 \quad \text{Equation 5}$$

$$T = 7 \cdot \text{sqrt}[P_i(t_j)] \quad \text{Equation 6}$$

where, $P_i(t_j)$=the current covariance;

$P_i(t_{j-1})$=the previous covariance (at filter initialization and whenever unsmoothed pseudoranges are being applied, $P_i = 2\sigma_u^2$);

N=the number of samples smoothed, up to a maximum of 100; and $T = 9.90\sigma_u$.

d) Whenever Channel 1 and Channel 2 pseudoranges are available that pass the outlier screening check of Equation 3, the following validity check is performed by processor 150 by comparing the value of $B_i(t_j)$ to T (or, when carrier smoothing is not being performed, the value of $[PR_1(t_j)-PR_2(t_j)]$ to $9.90\sigma_u$). If the validity check fails, the satellite is excluded from the navigation solution used to produce positioning outputs 190. Repeated occurrences of satellite exclusions at a statistically high rate are indicative of a fault in one of the signal processors 130 or 140; in this case, a fault is logged to trigger a maintenance action.

e) If either the Channel 1 or the Channel 2 pseudorange measurements are not available, or violate the outlier screening check, for one or two seconds in a row, then the threshold computation is propagated by processor 150, but no check is made. If the check cannot be made for three seconds in a row, then the satellite is declared unavailable for use in the navigation solution (provided at output 190) until the smoothing and monitoring processes can be re-started.

f) Whenever the smoothing filter is reset, the associated pseudorange residual filter and threshold computation are reset. Before re-starting carrier smoothing, both Channel 1 and Channel 2 must have an un-smoothed pseudorange available, and the following validity check must pass, or else the satellite is excluded from the navigation solution:

$$[PR_1(t_j)-PR_2(t_j)]<4\sigma_u$$

Although the present invention has been described with reference to illustrative embodiments, workers skilled in the art will recognize that changes may be made in form and detail without departing from the spirit and scope of the invention. For example, in various other embodiments, separate antennas and radio frequency front end circuitry can be associated with each of the signal processors Also, instead of a single navigation processor, redundant navigation processors can be used. In embodiments using separate navigation processors, each navigation processor can have a single signal processor, and can be cross-wired to the signal processor of the other navigation processor to provide the desired redundancy. Further, while embodiments of the present invention have are described herein with reference to two signal processors, other embodiments can utilize three or more signal processors to provide the redundant information. These and other embodiments are covered by the appended claims.

What is claimed is:

1. A satellite navigation system comprising:
   an antenna adapted to receive satellite signals transmitted from a plurality of satellites;
   radio frequency circuitry coupled to the antenna and adapted to convert the satellite signals into intermediate signals;
   a first signal processor coupled to the radio frequency circuitry and adapted to implement first signal processing algorithms on the intermediate signals to obtain first signal processor ranging information;
   a second signal processor coupled to the radio frequency circuitry and adapted to implement the same first signal processing algorithms on the intermediate signals as implemented by the first signal processor to obtain second signal processor ranging information; and
   a navigation processor coupled to each of the first and second signal processors, the navigation processor implementing a smoothing filter function on linear combinations of the first signal processor ranging information and the second signal processor ranging information, the navigation processor also implementing a fault detection and exclusion filter function to provide fault detection residual information, wherein features of the fault detection and exclusion filter function are matched to features of the smoothing filter function.

2. The satellite navigation system of claim 1, wherein the radio frequency circuitry is adapted to convert the satellite signals into intermediate signals which are indicative of code pseudorange measurements and of carrier phase measurements and wherein the first and second signal processors are adapted to implement the first signal processing algorithms to obtain the ranging information, the first signal processor ranging information and the second signal processor ranging information each including the code pseudorange measurements and the carrier phase measurements.

3. The satellite navigation system of claim 2, wherein the navigation processor is adapted to implement the fault detection and exclusion filter function and to compare the code pseudorange measurements provided by the first signal processor to the code pseudorange measurements provided by the second signal processor.

4. The satellite navigation system of claim 3, wherein the navigation processor is adapted to implement the smoothing filter function to provide carrier smoothed code pseudorange measurements as a function of unsmoothed code pseudorange measurements and as a function of the carrier phase measurements.

5. The satellite navigation system of claim 4, wherein the navigation processor is adapted to implement the fault detection and exclusion filter function such that the fault detection and exclusion filter function is equivalent to the smoothing filter function, thereby matching the characteristics of the fault detection and exclusion filter function to the features of the smoothing filter function.

6. The satellite navigation system of claim 5, wherein the fault detection and exclusion filter function is a first order equivalent to the smoothing filter function.

7. The satellite navigation system of claim 6, wherein the smoothing filter function implemented by the navigation processor generates a carrier-smoothed pseudorange output $P_S(t_j)$ using the relationship:

$$P_S(t_j)=k_j P_U(t_j)+(1-k_j)[P_S(t_{j-1})+\Delta\phi(t_j)]$$

where $k_j$ is a filter gain at time $t_j$, $P_U(t_j)$ is a linear combination of an unsmoothed pseudorange measurement from the first signal processor at time $t_j$ and an unsmoothed pseudorange measurement from the second signal processor at time $t_j$, $P_S(t_{j-1})$ is a previous carrier-smoothed pseudorange measurement, and $\Delta\phi(t_j)$ is a carrier source.

8. The satellite navigation system of claim 7, wherein the fault detection and exclusion filter function implemented by the navigation processor generates unsmoothed pseudorange residuals $B_i(t_j)$ using the relationship:

$$B_i(t_j)=(1-k_j)B_i(t_{j-1})+k_j[PR_1(t_j)-PR_2(t_j)]$$

where $k_j$ is the smoothing filter gain at time $t_j$ a particular satellite i, $PR_1(t_j)$ is an unsmoothed pseudorange from the first signal processor, and $PR_2(t_j)$ is an unsmoothed pseudorange from the second signal processor, $B_i(t_{j-1})$ is a previous residual.

9. The satellite navigation system of claim 1, wherein the antenna and the radio frequency circuitry further include a separate antenna and radio frequency circuitry combination associated with, and providing the intermediate signals to, each of the first and second signal processors.

10. A method of generating navigation data using a satellite navigation system receiver, the method comprising:
   receiving satellite signals transmitted from a plurality of satellites;
   converting the satellite signals into intermediate signals;
   performing first signal processor algorithms on the positioning signals using a first signal processor to obtain first signal processor ranging information;
   performing the same first signal processor algorithms on the positioning signals using a second signal processor to obtain second signal processor ranging information;
   performing a smoothing filter function on linear combinations of the first signal processor ranging information and the second signal processor ranging information using a navigation processor to generate smoothed positioning information;
   performing a fault detection and exclusion filter function, having features which are matched to features of the smoothing filter function, to provide fault detection residual information to detect faults in the positioning information outputs and exclude erroneous data from the navigation solution.

11. The method of claim 10, wherein converting the satellite signals into intermediate signals further comprises converting the satellite signals into ranging signals which are indicative of code pseudorange measurements and of carrier phase measurements.

12. The method of claim 11, wherein performing the first signal processor algorithms on the intermediate signals using the first and second signal processors includes performing the first signal processing algorithms to obtain as the first signal processor ranging information and the second signal processor ranging information code pseudorange measurements and carrier phase measurements.

13. The method of claim 12, wherein performing the smoothing filter function further comprises providing carrier smoothed code pseudorange measurements as a function of unsmoothed code pseudorange measurements and as a function of the carrier phase measurements.

14. The method of claim 13, wherein performing the fault detection and exclusion filter function further comprises performing the fault detection and exclusion filter function such that it's characteristic response is equivalent to the smoothing filter function, thereby matching the characteristics of the fault detection and exclusion filter function to the features of the smoothing filter function.

15. The method of claim 14, wherein performing the fault detection and exclusion filter function further comprises performing the fault detection and exclusion filter function such that it is a first order equivalent to the smoothing filter function.

16. The method of claim 15, wherein performing the smoothing filter function further comprises generating a carrier-smoothed pseudorange output $P_S(t_j)$ using the relationship:

$$P_S(t_j)=k_j P_U(t_j)+(1-k_j)[P_S(t_{j-1})+\Delta\phi(t_j)]$$

where $k_j$ is a filter gain at time $t_j$, $P_U(t_j)$ is a linear combination of an unsmoothed pseudorange measurement from the first signal processor at time $t_j$ and an unsmoothed pseudorange measurement from the second signal processor at time $t_j$, $P_S(t_{j-1})$ is a previous carrier-smoothed pseudorange measurement, and $\Delta\phi(t_j)$ is a carrier source.

17. The method of claim 16, wherein performing the fault detection and exclusion filter function further comprises generating unsmoothed pseudorange residuals $B_i(t_j)$ using the relationship:

$$B_i(t_j)=(1-k_j)B_i(t_{j-1})+k_j[PR_1(t_j)-PR_2(t_j)]$$

where $k_j$ is the smoothing filter gain at time $t_j$ a particular satellite i, $PR_1(t_j)$ is an unsmoothed pseudorange from the first signal processor, and $PR_2(t_j)$ is an unsmoothed pseudorange from the second signal processor, $B_i(t_{j-1})$ is a previous residual.

18. The method of claim 14, and further comprising generating a position indicative output, using the navigation processor, as a function of the smoothed positioning information.

* * * * *